(12) United States Patent
Reich et al.

(10) Patent No.: US 8,301,109 B2
(45) Date of Patent: Oct. 30, 2012

(54) SYSTEM AND METHOD FOR DETERMINING THE ROUTING OF 911 CALLS

(75) Inventors: Don Reich, Ventura, CA (US); Kurt Warner, Carpinteria, CA (US); Jim DeArkland, Ventura, CA (US); Bruce Thomas, Ventura, CA (US)

(73) Assignee: Boar's Head Corporation, Ventura, CA (US)

( * ) Notice: Subject to any disclaimer, the term of this patent is extended or adjusted under 35 U.S.C. 154(b) by 302 days.

(21) Appl. No.: 12/574,664

(22) Filed: Oct. 6, 2009

(65) Prior Publication Data

US 2010/0093305 A1    Apr. 15, 2010

Related U.S. Application Data

(60) Provisional application No. 61/103,203, filed on Oct. 6, 2008.

(51) Int. Cl.
*G06F 15/18* (2006.01)
(52) U.S. Cl. .................................. 455/404.1; 455/432.3
(58) Field of Classification Search ............... 455/404.1, 455/404.2, 432.3, 433, 458, 456.1, 456.6
See application file for complete search history.

(56) References Cited

U.S. PATENT DOCUMENTS

| | | |
|---|---|---|
| 5,930,717 A | 7/1999 | Yost et al. |
| 6,519,530 B2 | 2/2003 | Crockett |
| 6,697,630 B1 | 2/2004 | Corwith |
| 7,031,714 B1 | 4/2006 | Rayburn |
| 7,072,666 B1 | 7/2006 | Kullman et al. |
| 7,177,623 B2 | 2/2007 | Baldwin |
| 8,086,252 B2 | 12/2011 | Luers |
| 2005/0003797 A1 | 1/2005 | Baldwin |
| 2008/0037461 A1 | 2/2008 | Biltz |
| 2009/0044246 A1* | 2/2009 | Sheehan et al. ............... 725/146 |
| 2009/0136011 A1* | 5/2009 | Goel ........................ 379/114.01 |

FOREIGN PATENT DOCUMENTS

WO   WO 2007/258701 A1   3/2007

OTHER PUBLICATIONS

Fisher, N. I., "Statistical analysis of circular data," Press Syndicate of the University of Cambridge, Cambridge University Press, The Pitt Building, Trumpington Street, Cambridge CB2 1RP, ©1993, Reprinted 1995, pp. 30-34, pp. 81-89.
Jasso, Hector et al., "Prediction of 9-1-1 Call Volumes for Emergency Event Detection," 2007, pp. 148-154.
Vincenty, T., DMAAC Geodetic Survey Squadron, F. E. Warren AFB, Wyoming 82001, "Direct and Inverse Solutions of Geodesies on the Ellipsoid With Application of Nested Equations," vol. XXIII, No. 176, Survey Review, Apr. 1975, Directorate of Overseas Surveys of the Ministry of Overseas Development, Kingston Road, Tolworth, Surrey, pp. 88-93.

* cited by examiner

*Primary Examiner* — Sam Bhattacharya
(74) *Attorney, Agent, or Firm* — Brinks Hofer Gilson & Lione (57) ABSTRACT

A system and method for determining the historical density of 911 calls from wireless devices. This determination is made over a certain geographical area for a statistically significant amount of time. Once the historical density of these wireless 911 calls has been determined, further determining the most efficient routing of future 911 calls in order to improve the delivery of the wireless 911 call to the responding emergency service provider. The system and the method further provides a method for use by public safety officials, communication providers and other governmental or private entities to manage and control approval and actual changes to the routing of wireless 911 calls.

20 Claims, 12 Drawing Sheets

Request Data / Other Actions

| Name | ID | Region | Provider | Address | City | Sector | Routing | PSAP | Rt. | SP |
|---|---|---|---|---|---|---|---|---|---|---|
| Oxnard PD | 10178 | VEN | ATTMO | 2900 SAVIERS RD | OXNARD | NE | | Pending | Pending | Accepted |

Please tell us what additional data you need to help you decide, or what other action or recommendation you would make for this sector.

☐ I still need more information before I can decide. (place your request below)
☐ Call volume is too large.
☐ Another PSAP should receive these calls first.
☐ Other (please specify)

Please enter any questions, requests or recommendations :

900

| Submit | Cancel (go back to Map Summary) | Cancel (go back to Sector List) |

Request Data / Other Actions Confirmation

| Name | ID | Region | Provider | Address | City | Sector | Routing | PSAP | Rt. | SP |
|---|---|---|---|---|---|---|---|---|---|---|
| Oxnard PD | 10178 | VEN | ATTMO | 2900 SAVIERS RD | OXNARD | NE | | Pending | Add'l. Data Req. | Accepted |

Your request for additional information and/or other actions was transmitted.
You will receive a response via e-mail or telephone after we have reviewed your submission.

| Sector List |

SYSTEM AND METHOD FOR DETERMINING THE ROUTING OF 911 CALLS

CROSS REFERENCE TO RELATED APPLICATIONS

This application claims priority to U.S. Provisional Application No. 61/103,203 filed on Oct. 6, 2008, the entirety of which is incorporated herein by reference.

FIELD OF THE INVENTION

The present invention generally relates to systems and methods for routing emergency 911 telephone calls, and more particularly to systems and methods for routing emergency 911 calls that originate from wireless devices.

BACKGROUND OF THE INVENTION

Virtually since the invention of the telephone by Alexander Graham Bell in 1876, it has been recognized that a unique telephone number for notifying authorities of emergencies (crime, fire, injury . . . ) would be a tremendous boon to public health and safety.

Britain implemented its first emergency telephone system in 1937 using the number 999. This British system serving police, fire and Emergency Medical Service (EMS) was developed after fatal delays in phone calls reporting a fire on Wimpole Street. In 1957 the National Association of Fire Chiefs in the United States suggested a single number for reporting fires. In 1958 New Zealand instituted their 111 emergency telephone number. In 1959 the police department in Winnipeg Canada introduced North America's first emergency telephone system. President Lyndon Johnson's Commission on Law Enforcement and Administration of Justice issued a report in 1967 that recommended a single number for emergency calls that should be used nationwide.

In cooperation with AT&T (the predominant telephone carrier at that time), the designation of 911 as a universal emergency number was announced in January of 1968. The first 911 system was adopted in California in 1970. In the mid 1970s California's Alameda County launched the first 911 system that provided for selective routing of 911 calls. Prior to this pilot project, all 911 calls were routed according to "hard wired" instructions in the switching systems of the telephone companies. This original pilot program provided the county's Public Safety Answering Points (PSAPs) with the Automatic Number Identification (ANI) of the caller. This system did not provide for Automatic Location Identification (ALI) which would allow the PSAP to immediately and electronically identify the location of the originating landline telephone.

Although the selective routing of 911 calls has evolved and, for the most part, has worked very well for landline telephones, the prevalence of wireless communication devices (cell phones) presents new challenges.

The number of subscribers in the United States using wireless services grew from 55 million in 1997 to 253 million in 2007. Worldwide there are 2.3 billion wireless subscribers. 8% of the United States population uses cell phones with a volume of 2 trillion wireless minutes in 2007. 12.8% of United States households are "wireless only." Californians alone placed 23.3 million 911 calls in 2007. Of these, 11.6 million (50%) were made from wireless devices. Current estimates are that 58% of 911 calls are wireless The early development, deployment, evolution and growth of the wireless technology are highly relevant to the present invention. Many, if not the majority of original cell phone towers in the United States were placed along the major highways throughout the country. Part of the reason for this placement of towers was due to the existing right of way which facilitated their placement. The primary reason for their placement along highways though, was that most of the initial deployment of cell phones was in automobiles ("car phones").

As most emergency 911 calls from original wireless devices, car phones, originated on the highway, a completely rational decision was made to route these calls to the authority with the jurisdiction for responding to emergencies on the highways. Typically this was the Highway Patrol (e.g., California Highway Patrol (CHP) in California). For the most part, this system of routing wireless 911 calls to the Highway Patrol persists to this day. When fielding these wireless 911 calls approximately 95% are rerouted from the Highway Patrol to the appropriate PSAP that has jurisdiction over the emergency (e.g., local police department, fire department, sheriff, EMS . . . ).

As is readily appreciated, time is of the essence in many, if not most, emergency situations (e.g., a house fire). Often, a matter of minutes can literally mean the difference between life and death. As is further appreciated, the present system inherently induces a delay of the responders as the wireless 911 phone call must first be routed to the legacy entity (e.g., the Highway Patrol) and then subsequently routed to the appropriate responding PSAP.

SUMMARY OF THE INVENTION

The system and method of the present invention provides a method of determining the historical density of 911 calls from wireless devices. This determination is made over a certain geographical area for a statistically significant amount of time. Once the historical density of these wireless 911 calls has been determined, the system and method of the present invention further determines the most efficient routing of future 911 calls in order to improve the delivery of the wireless 911 call to the responding emergency service provider. The system and the method of the present invention further provides a method for use by public safety officials, communication providers and other governmental or private entities to manage and control approval and actual changes to the routing of wireless 911 calls.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

Figure 1:
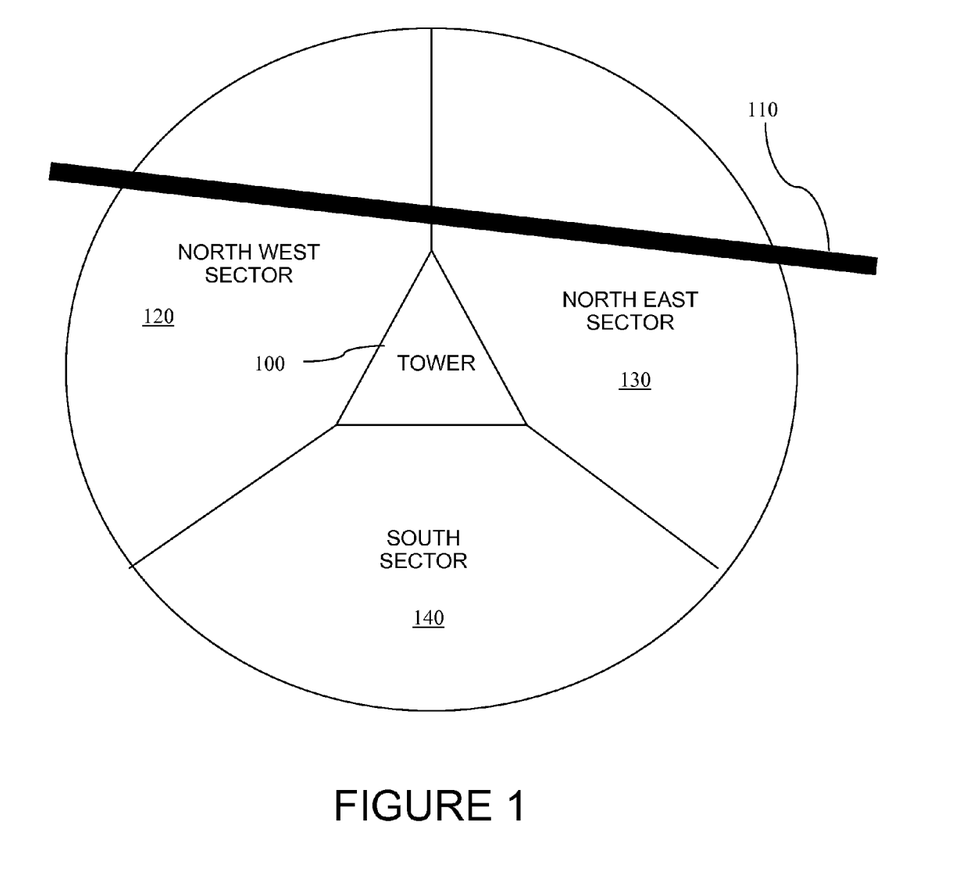
FIG. 1 illustrates the sector division of the cell phone tower.

FIG. 1 illustrates a typical cell phone tower 100 that is positioned next to a highway 110. Cell phone towers typically have several sides facing different directions. These tower faces typically accommodate one or more antennas for receiving and sending wireless communications (e.g., cell phone calls). The antennas can be unidirectional or omnidirectional. Furthermore, there can be antennas from one or more service providers provided on a single cell tower (e.g., AT&T™, Sprint™, T-Mobile™ . . . ).

The exemplary tower 100 depicted in FIG. 1 has three distinct faces corresponding to three sectors: a North West sector 120; a North East sector 130; and a South sector 140. Although illustrated as sharply defining a geographic area, the sectors 120-140, in reality, correspond to the reception and transmission areas of the antennas on the tower 100. For example, although a cell phone call might originate from a physical position located in the North East sector 130 as illustrated in FIG. 1, this cell phone call might actually be detected and serviced by one of the antennas forming the South sector 140.

Figure 2:
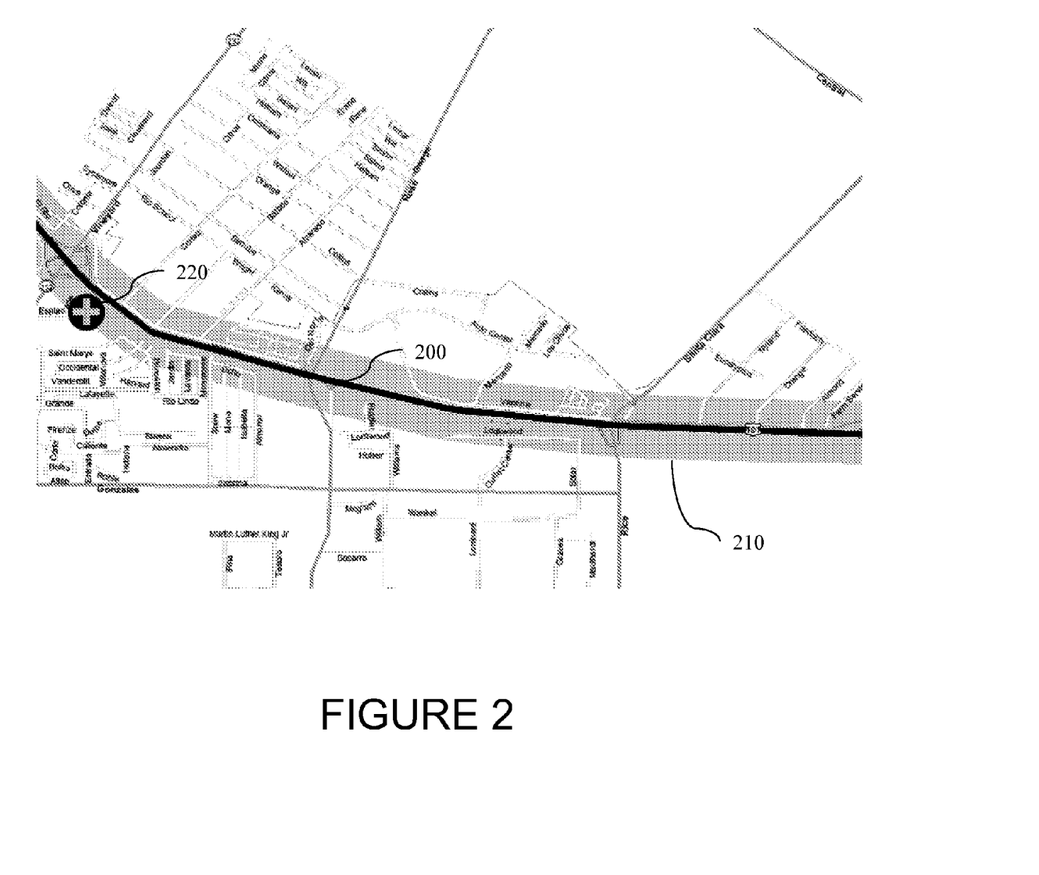
FIG. 2 depicts the buffer zone around a highway.

FIG. 2 illustrates a still persisting historical configuration for 911 cell phone call routing. As illustrated in this figure, a cell phone tower 220 is located next to a highway 200. Element 210 represents a physical/geographic buffer zone that is created around the highway 200. Similar buffer zones 210 were created around most of the significant highways. A decision was made that if a cell phone tower (e.g. tower 220) was located within the buffer zone 210, all 911 cell phone calls received by this tower would be routed to the Highway Patrol. Historically, this was a completely rational and justified decision because, as previously described, the majority of cell phone calls at the inception of the cell phone networks originated from the highway.

Figure 3:
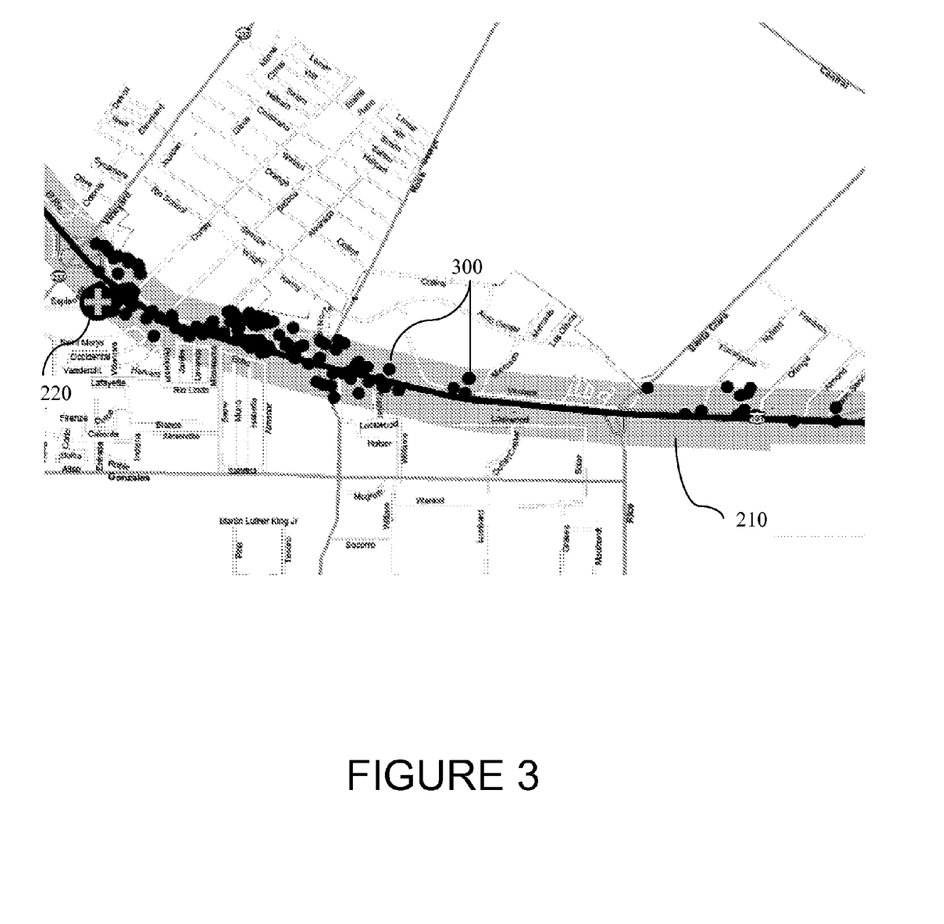
FIG. 3 illustrates the 911 cell phone calls originating within the buffer zones.

FIG. 3 is a graph illustrating the actual physical locations of 911 cell phone calls 300 that originated within the buffer zone 210. There are a variety of methods utilized to determine the location of a 911 wireless caller's location. For example, some new wireless devices contain global positioning system (GPS) mechanisms that allow the device itself to determine its x-y location (e.g., a longitude and latitude coordinate position). Devices incorporating this GPS technology are able to transmit the device's position along with the cell call's voice data to the cell phone tower 220 and subsequently to the telecommunication company's base station and ultimately the recipient of the phone call (e.g., a PSAP workstation). Alternatively, the telecommunication company's network, using the detection of the caller's cell phone signal by several antennas, is able to use triangulation methods in order to determine the physical x-y location of the wireless device. Phone calls in which the x-y location is able to be determined are known in the art as Phase 2 cell phone calls. Presently, 80% of all cell phone calls are Phase 2 phone calls.

Each of the emergencies represented by the cell phone calls 300 depicted in FIG. 3 as originating in the buffer zone 210 more likely than not properly fell within the jurisdiction of the Highway Patrol (i.e., there was an accident on the highway the Highway Patrol necessarily had to respond to the emergency themselves). No further routing of these cell phone calls 300 was most likely necessary.

Figure 4:
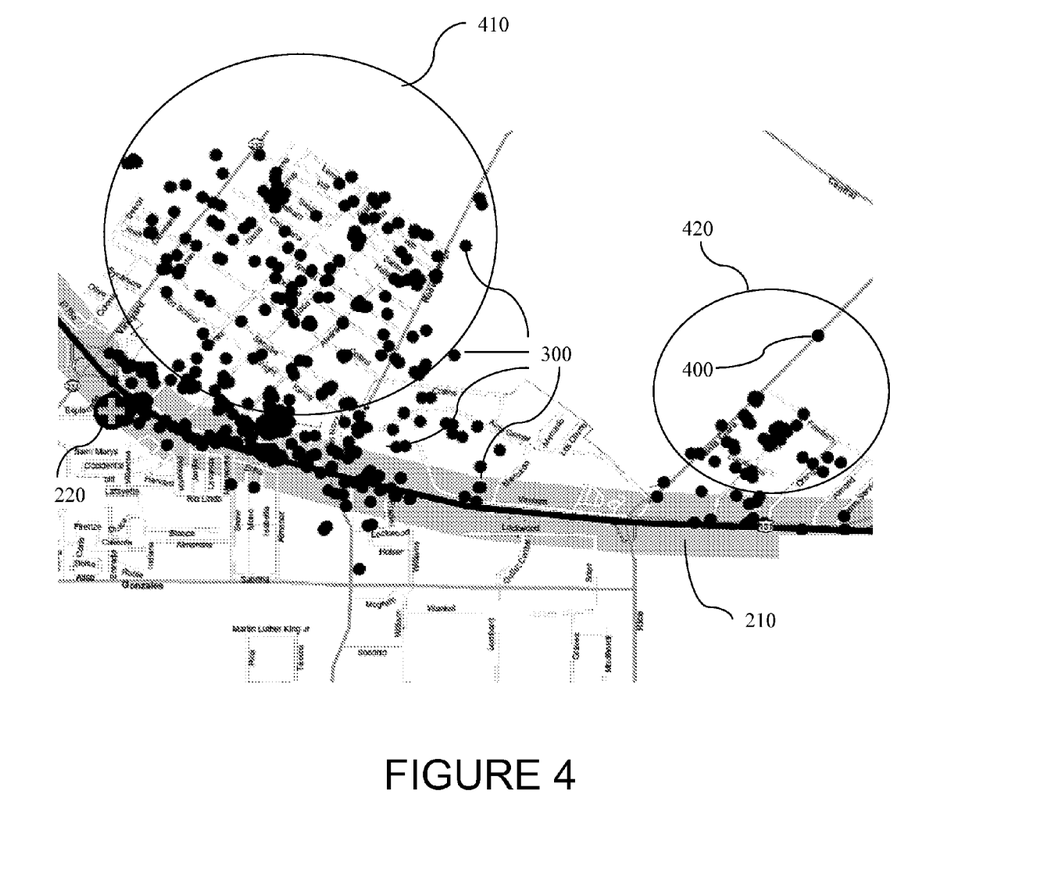
FIG. 4 illustrates the entirety of cell phone calls originating in a sector.

However, as illustrated in FIG. 4, there were many more 911 cell phone calls 300 received in this sector of this particular cell phone tower 220. In fact, the majority of the 911 wireless calls 300 received in this sector did not fall within the buffer zone 210 and the Highway Patrol did have to respond to these emergencies. As illustrated in this figure, there are two distinct areas 410, 420 from which 911 emergency wireless calls originated that are not within the buffer zone 210. Statistically, all of these calls that did not originate within the buffer zone 210, i.e., calls from residential or business areas 410, 420, away from the highway, had to be routed by the Highway Patrol's 911 call center to the entity, PSAP, which needed to respond to the particular emergency. In a preferred embodiment, the jurisdictional boundaries for the various PSAPs, such as the buffer zone 210 of the CHP, are displayed on the map generated by the system of the present invention.

For example, if the wireless 911 call designated as 400 in FIG. 4 was reporting a fire, this phone call would have first come to the Highway Patrol 911 call center. The operator at the Highway Patrol 911 call center, after speaking with the caller would determine the nature and location of the emergency and would then have to route the call to the local fire department with jurisdiction for responding to this emergency. As is readily understood, the time delay for having the call initially routed to the Highway Patrol, answered by the Highway Patrol call center personnel and the subsequently routed to the local fire department was a delay of precious time during an emergency fire situation.

Furthermore, in addition to the delays associated with the historical routing of 911 emergency wireless calls, the limited resources of the Highway Patrol also induces further delays. For example, in the state of California, there are approximately 170 CHP call center work stations allocated to 911 calls. In comparison, there are approximately 1,800 PSAP workstations dedicated to 911 calls throughout the state. This mismatch in resources combined with the historical routing of virtually all 911 calls to the Highway Patrol leads to significantly longer on-hold times for wireless 911 callers in the state of California. These long wait times further lead to a significant volume of abandoned 911 cell calls where the caller simply gives up trying to use the 911 facility with their cell phone.

The wireless 911 cell phone call density map illustrated in FIG. 4 is one of the tools provided by the method and system of the present invention for determining whether or not 911 wireless calls should be automatically routed to the Highway Patrol or whether they should initially be routed to another more appropriate PSAP. As shown in FIG. 4, more than 50% of the calls routed to the Highway Patrol in this particular sector are not eventually responded to by the Highway Patrol and must be re-routed. The system and method of the present invention applies a predetermined threshold (e.g., 51%) of the phone calls that are responded to by another authority before a decision is made to re-route the 911 wireless calls to a PSAP other than the Highway Patrol (otherwise termed "cutting over" to another PSAP).

Figure 5:
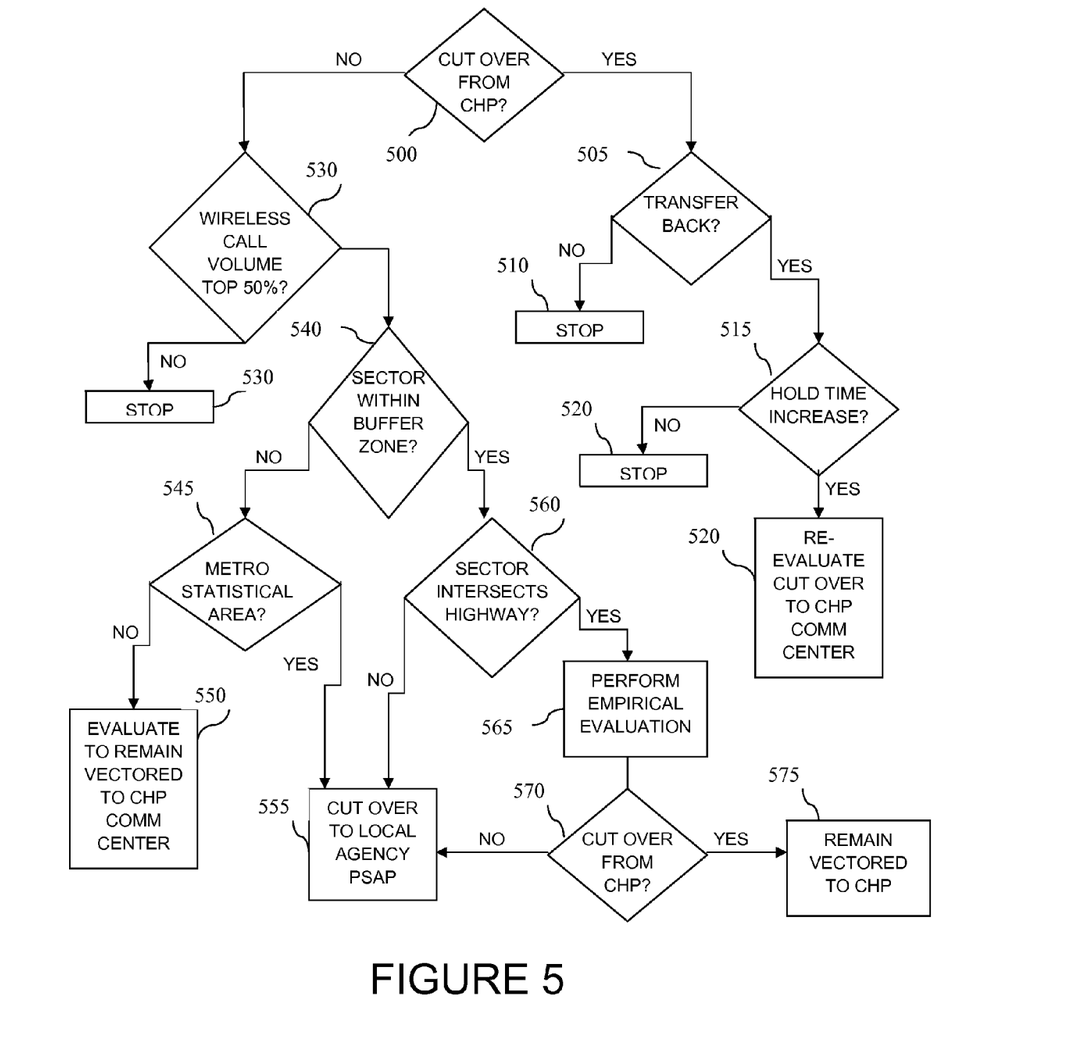
FIG. 5 depicts a method of the present invention.

FIG. 5 illustrates a method of the present invention for optimizing the routing of phone calls from sectors of cell phone towers.

The method illustrated in FIG. 5 is the high level decision and processing performed in the optimization of the 911 call routing optimization process and system. In step 500, it is determined whether or not the decision has already been made to transfer a sector from the CHP over to another PSAP call center. By the phrase "transferring a sector" what is meant is that all 911 wireless emergency calls received by an antenna representing the sector will be first routed to the transferee PSAP call center, rather than maintaining the historical routing of such wireless 911 phone calls to the CHP. If the decision was made in the past and the transfer should happen and actually took place, the decision block 505 of the present invention begins the process of determining whether or not to maintain the present routing to the other PSAP or to transfer the initial routing of 911 wireless emergency calls back to the CHP. If less than 50% of the 911 wireless calls are not being routed to the new PSAP eventually resulted in the necessity of the CHP to respond, then the process is stopped in step 510 and the routing of the 911 wireless calls continues to the new PSAP (e.g., the local police department). If during the intervening time since the decision was made to transfer the 911 call responsibility to the other PSAP, conditions have changed and more than 50% of the emergencies corresponding to the 911 wireless calls require response by CHP personnel, a further decision is made in step 515. In this step, the current trend in hold times for callers being routed to the new PSAP is analyzed. If, following the transfer from the CHP to the new PSAP, the average hold time of wireless callers to the PSAP has not increased, then no further action is necessary and the process is stopped at step 520. Conversely, if the hold times at the PSAP have increased since the added responsibility of all of the cutover 911 wireless calls, in step 525 a recommendation is made to reevaluate whether or not the 911 wireless calls from that sector should be returned back over to the CHP communications center.

Returning to the decisions coming out of block 500, if there has not been a cutover from the CHP communications center (i.e., all 911 wireless calls from that sector are being handled by the CHP) in block 530 it is determined whether or not the call volume experienced in this sector is within the top 5% of call volume within the 911 system. If it is not, the process is stopped at step 535. If it is determined that this is a high volume sector, it is next determined in step 540 whether or not the sector resides within the buffer zone as previously described. If the sector is not within a buffer zone, a further determination is made in step 545 as to whether or not the sector includes a Metropolitan Statistical Area (i.e., a large city). If the sector does not include a Metropolitan Statistical Area, in step 550 a recommendation is made to have the 911 wireless calls received by this sector continued to be routed to the CHP communications center. If the sector does include a Metropolitan Statistical Area, a recommendation is made in step 555 to change the switching mechanisms in the telecommunication network to initially forward all 911 wireless calls to the PSAP in the jurisdiction from which the majority of the 911 calls originate (e.g., the local police department).

Returning to the decisions coming out of block 540, if the sector is within a buffer zone, a further determination is made in step 560 as to whether or not the sector includes a highway or freeway. For example, as illustrated in FIG. 1, the south sector of the tower illustrated in this figure does not include the highway. If this is the case, a recommendation is made in step 550 to cutover the 911 wireless calls to the local PSAP agency. If the sector does intersect a highway or freeway, an empirical evaluation is performed in step 565. The empirical evaluation would include the mapping of the origination of 911 wireless calls as is illustrated in FIG. 4. This empirical evaluation aids in the determination in step 570 as to whether or not the Highway Patrol was dispatched to the emergency in more than 50% of the phone calls from that sector. If not, a recommendation is made to cutover the 911 wireless calls to the local PSAP in step 550. If more than 50% of the emergencies represented by the 911 wireless calls from that sector eventually required CHP dispatch then a decision is made in step 575 to continue routing of 911 wireless calls from that sector to the CHP communication center.

Figure 6:
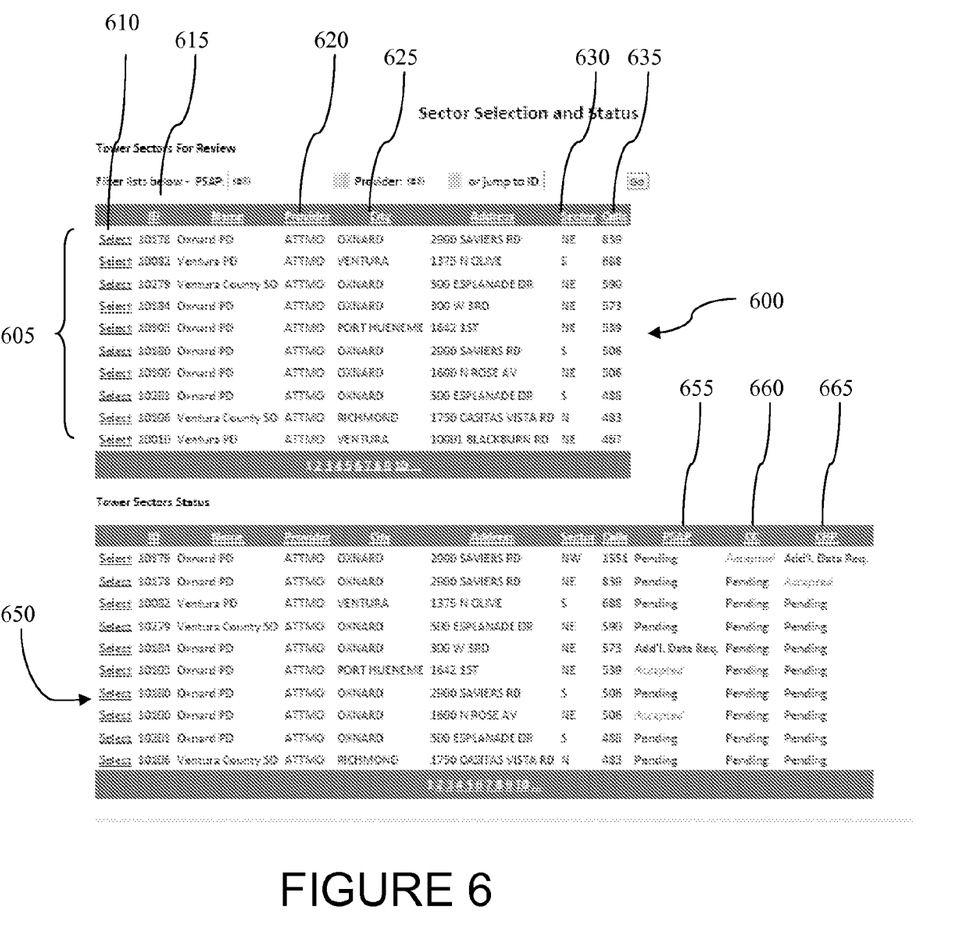
FIGS. 6-12 illustrate various user interfaces of the system of the present invention.

FIG. 6 illustrates an exemplary graphical user interface of the system of the present invention. In a preferred embodiment, this is the first user interface screen that is presented to the user of the system. Table 600 in this interface provides a listing of the sectors under review in the system. As previously described, a threshold can be set in the system such that, for example, if less than fifty percent of the wireless 911 call are transferred to another jurisdiction from the primary routed PSAP (e.g., the CHP) then the sector is not considered a likely candidate and is not listed in table 600 for review.

Each of the rows 605 represents a different sector. The ID 615 is a unique identifier for the sector. The Provider column 620 identifies the telecommunications provider servicing that sector (e.g., SPPCS=Sprint PCS, T-MOB=T-Mobile, ATTMO=AT&T Mobile). The City column 625 identifies the city in which the sector resides. The Sector column 630 identifies the general geographical direction of the sector (e.g., south, southeast . . . ). The Calls column 635 represents the number of 911 wireless calls that originated in that sector.

Table 650 contains a listing of the records for the sectors in which some action toward a cut-over has occurred. Table 650 contains similar information as table 600 but is used to track the status of the acceptance or rejection of the system's cutover recommendations by the appropriate authorities. For example, in the exemplary embodiment illustrated in FIG. 6, there are three separate authorities that review and accept or reject the proposed cutover. Row 655 represents the PSAP to which the cutover will extend. Naturally, since this cutover potentially represents an increased burden on the PSAP's call center, the PSAP 655 should be involved in the process of determining whether a cutover should occur. Column 660 represents the review and approval or rejection by a governmental agency known as the County Coordinator. As appreciated by those skilled in the art, any number of required approving authorities can be added to the system and method of the present invention and their approval or rejection of the recommendation can be tracked using the system and method of the present invention. The approving authorities illustrated in the present specification are merely exemplary and are not limiting. Each of the reviewing authorities has several tools as described herein to view the graphical representations, summaries, and detailed analysis of received 911 wireless calls including the density thereof. Other evaluation tools available to these reviewing authorities include the historical wait times experienced by callers in each sector, the number of abandoned calls and other relevant information.

The remaining approving authority 665 in this exemplary embodiment is the California Highway Patrol, CHP, the entity from which responsibility for the initial handling of 911 wireless calls is potentially to be taken away. As previously described, the CHP in the present description is only exemplary of a PSAP to which the emergency system has been designed (programmed) to initially route 911 wireless calls. Other PSAP agencies could include the local police department, the State Police, the County Sheriff . . . .

Figure 7:
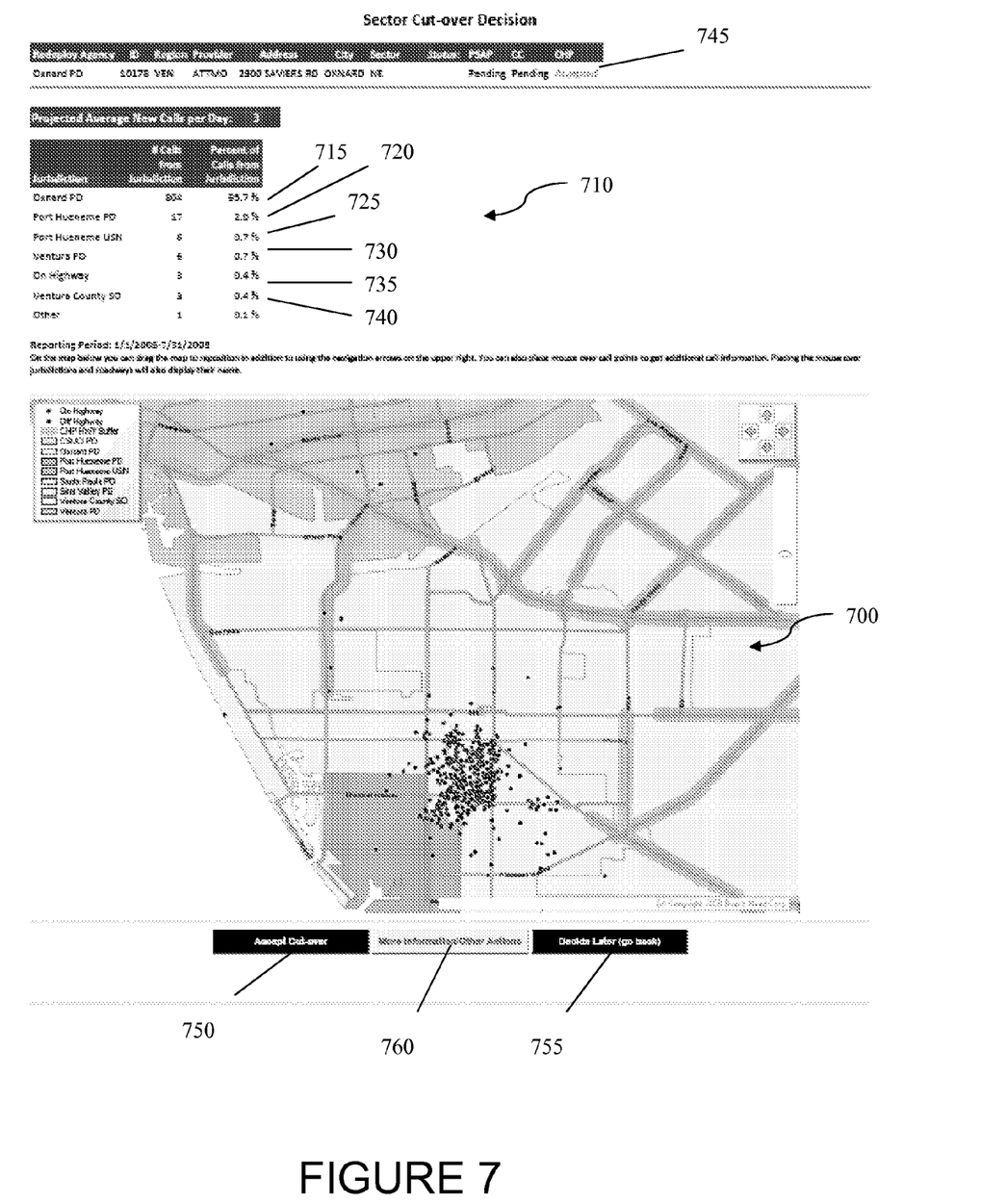

If the user clicks on the select button 610 for a particular sector, a new window is presented as illustrated in FIG. 7 that provides the user with additional information regarding the sector. This additional information includes a geographical map 700 of the sector depicting the wireless 911 phone calls received in that sector during a representative time frame. The time frame over which data related to the wireless 911 calls received and collected from a sector is variable and selectable by an administrator or user of the system. As illustrated in the density map 700, not a single wireless 911 phone call originated from the highway. As described above, the system and method of the present invention would recommend that the initial routing for all wireless 911 calls for this sector be routed to a PSAP other than the California Highway Patrol.

This feature of the present invention provides the user with an intuitive graphical representation of the density of the 911 wireless calls as opposed to a merely tabular representation of these calls. In the preferred embodiment of the present invention, the data related to the 911 wireless calls are received by the system of the present invention from the wireless providers. Additional data regarding the calls can be received by the system from a variety of sources such as the PSAPs themselves, other governmental agencies or other commercial sources. The data received by the system of the present invention is typically formatted in a wide variety of different formats. One of the features of the present invention is the ability of the system to take this data in disparate and incompatible formats and to create uniform records corresponding to each phone call in each sector.

In addition to the graphical map 700 presented in FIG. 7, this user interface provides additional detailed information regarding the 911 wireless calls received from a particular sector. The specific sector for which data is depicted in FIG. 7 is sector 10178 in Ventura County. The wireless provider serving this sector is AT&T Mobile™. As illustrated in table 710, six different PSAPs have responsibility, jurisdiction, for responding to the 911 wireless calls originating in this sector. As can be seen in this Figure, the overwhelming majority of 911 wireless calls from this sector (804 calls) fell within the jurisdiction of the Oxnard Police Department. Other PSAPs with jurisdiction in this particular sector are the Port Hueneme Police Department 720, the U.S. Naval station at Port Hueneme 725, the Ventura Police Department 730, the CHP 735, and the Ventura County Sheriff's Office 740.

In addition to the tabular representation of the call volumes depicted in table 710, the system and method of the present invention is able to present the user with a graphical representation of the call volume, such as in a pie chart.

As previously described, the system of the present invention provides the mechanisms to track the acceptance of a decision to cut over the initial routing of wireless 911 calls from the PSAP that currently receives such call (e.g., the CHP) to a new PSAP. Element 745 depicts that a cut over to the Oxnard Police Department is currently under consideration. As is readily appreciated, since 95.7% of the calls from this sector originated within the jurisdiction of the Oxnard Police Department, the Oxnard Police Department is the natural selection for where all of the 911 wireless calls in this sector should be initially routed. In the example depicted in FIG. 7, all of the calls from the sector are presently being routed to the CHP call centers. The CHP call center, after speaking with the caller and determining the location and nature of the emergency, subsequently re-routes the calls to appropriate PSAP that is required to respond to the emergency, e.g., the Oxnard Police Department, the Port Hueneme Police Department or another PSAP. If the cut-over decision is accepted, all of these 911 wireless calls will initially be routed to the Oxnard Police Department. As the CHP had historically done, after fielding the initial call and determining from the caller the jurisdiction required to respond to the emergency, the Oxnard PD would dispatch its own responders or transfer the call to the appropriate PSAP, e.g. the Port Hueneme Police Department.

In the example 745 illustrated in FIG. 7, the CHP has already accepted the decision to cut over the 911 wireless calls to the Oxnard PD. The Oxnard PD itself and the County Controller have not yet accepted the decision. If the representative from the Oxnard PD decided to accept the cut over, s/he would click the button 750 "Accept Cut-over." This action would present the Oxnard PD representative with the confirmation screen illustrated in FIG. 11. If the representative confirms the cut-over decision, the system presents them with the confirmation screen illustrated in FIG. 12.

Returning to FIG. 7, if the decision maker, e.g., the representative from the Oxnard PD, chooses not to make a decision at this time, s/he can click button 755 to return to the initial screen depicted in FIG. 6. If the user requires even more information to make a decision, s/he can click on button 760 and is presented with Additional sector data as is illustrated in FIG. 8.

Figure 8:
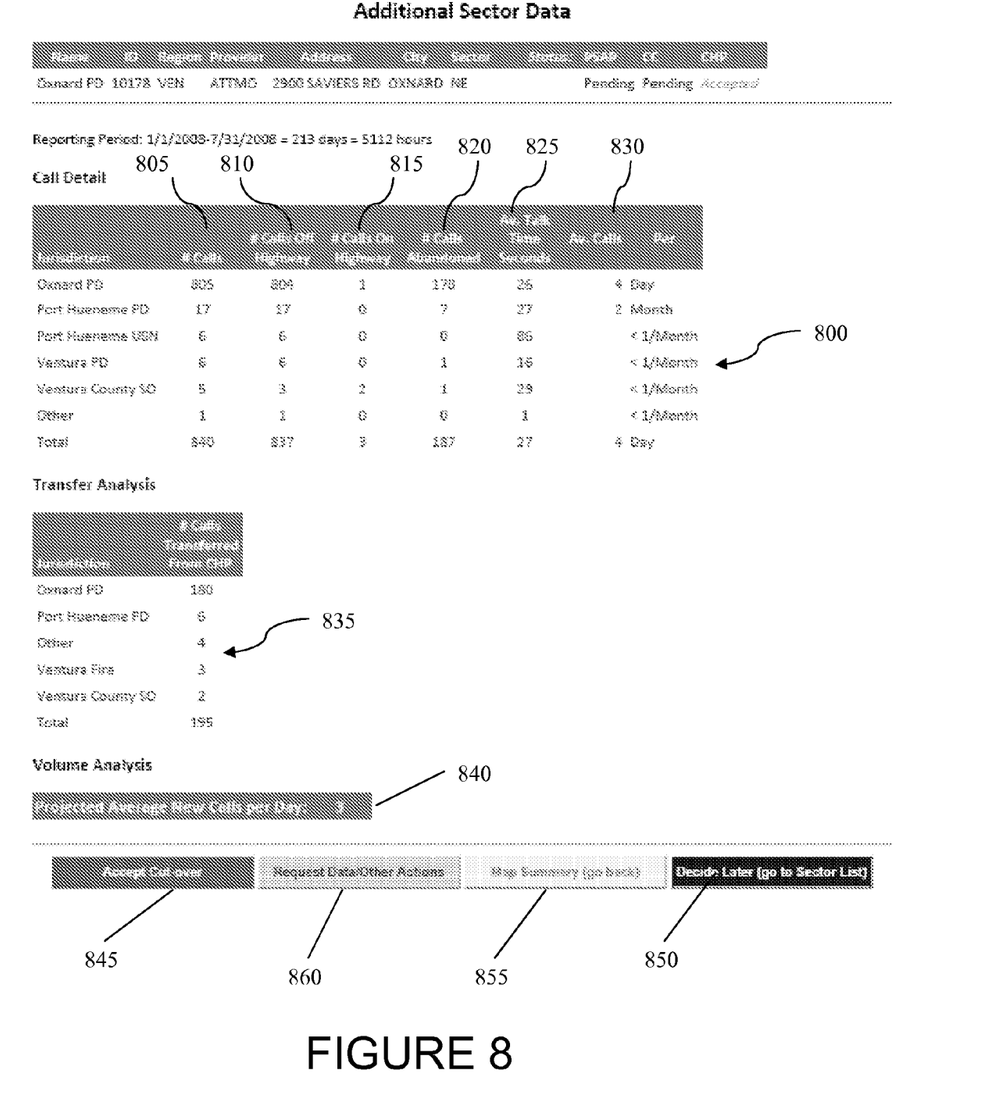

Table 800 as shown in FIG. 8 presents the user additional and more detailed information regarding the 911 wireless calls from the sector. This table 800 preferably includes the number of calls originating from the particular jurisdiction 805, the number of calls that were not on a highway in the jurisdiction 810, the number of calls that were on the highway 815, the number of the calls that were abandoned 820, the average length of the phone call in seconds 825 and the average number of calls per time period 830.

Although table 800 depicts that 805 phone calls originated from the Oxnard PD jurisdiction, in reality, the CHP only had to actually transfer 180 of these calls to the Oxnard PD as is illustrated in Table 835. The remainder of the calls required no action, i.e., were non-dispatchable. Some examples of non-dispatchable calls are repeat calls, which simply are reporting an emergency to which the responders have already been dispatched (e.g., the fifth caller reporting a fire). Other non-dispatchable calls are wrong numbers, non-emergency or similar calls where there was no actual emergency.

The user interface in FIG. 8 additionally displays to the user the system's determination 840 of how many additional phone calls the cut-over PSAP would expect to handle if the cut-over is accepted. In the particular example depicted in FIG. 8, the Oxnard PD could expect an additional 3 calls per day if they accept the cut-over. This determination by the system of the present invention allows the decision makers to evaluate the additional burden that can be expected to be placed on the cut-over PSAP.

Figure 9:
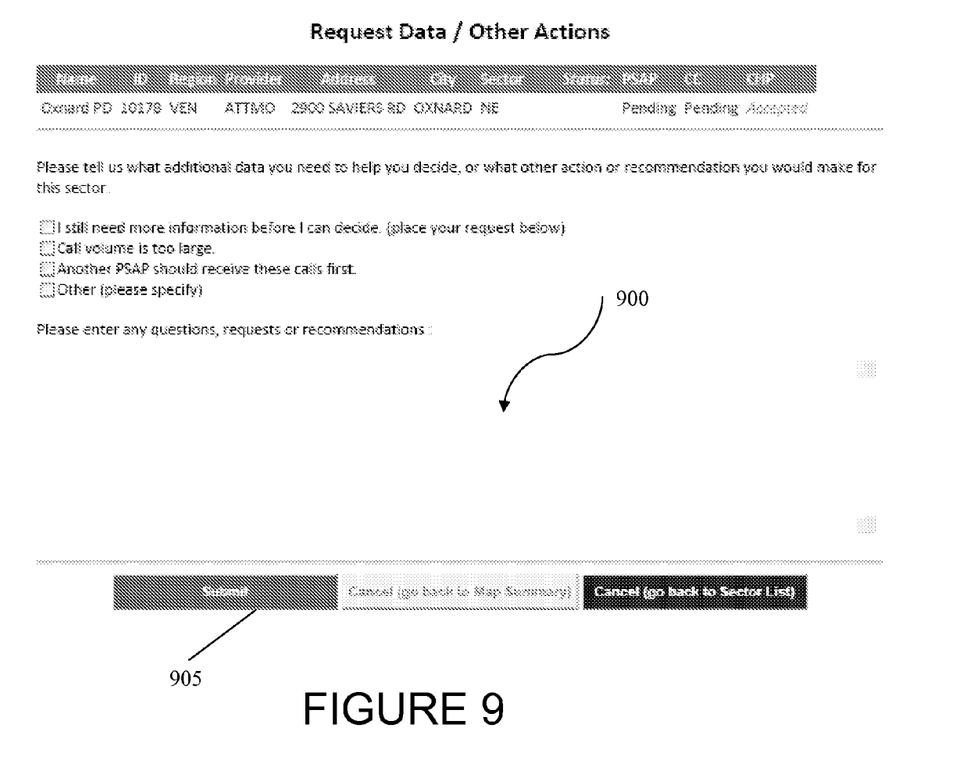
Figure 10:
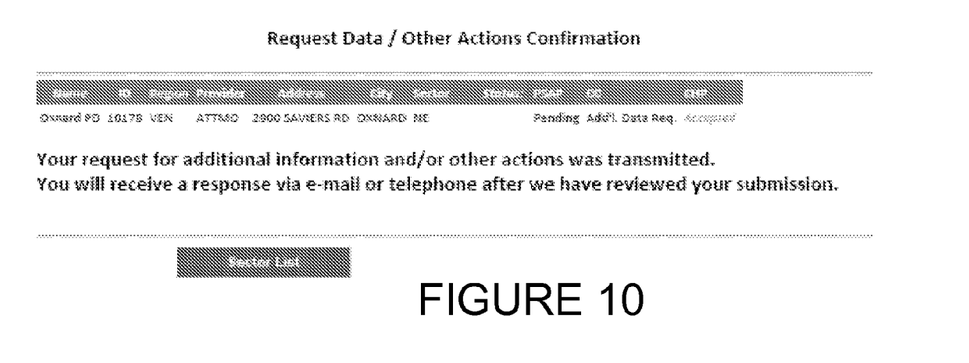
Figure 11:
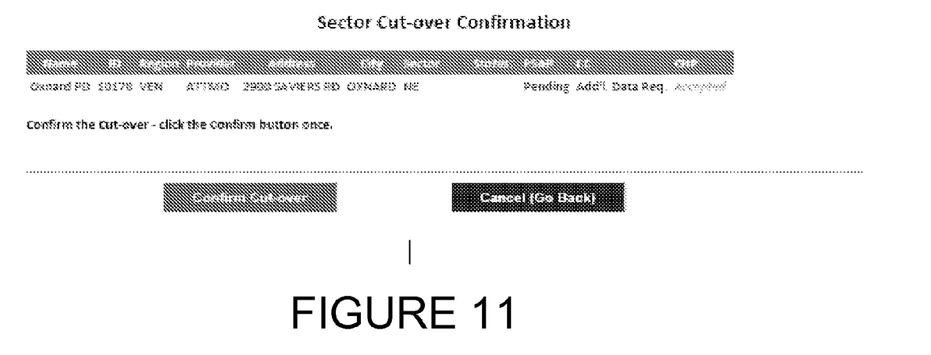
Figure 12:
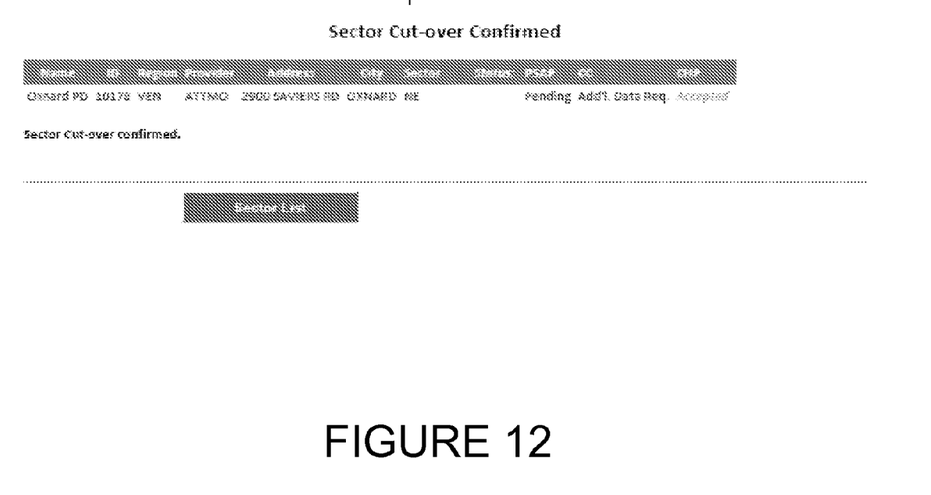

If the decision maker decides to accept the cut-over, s/he can click on button 845 and s/he is presented with the cut-over confirmation screens as previously described with respect to FIGS. 11 and 12. If the user clicks on button 850, they will return to the main screen illustrated in FIG. 6. Clicking the button 855 brings the user back to the map screen of FIG. 7. If the user still requires further information to render a decision, s/he can click on button 860 to be brought to the user interface depicted in FIG. 9. Through this interface, the user indicates why they might have objections to the proposed cut-over and/or manually request further information. This interface includes an area 900 in which the user can type his or her comments or questions. By hitting the Submit button 905, the user's questions are submitted to the system, are stored and can be retrieved, reviewed and answered by the appropriate person. FIG. 10 depicts the under interface that confirms that the user's comments/questions have been received.

Figure 13:
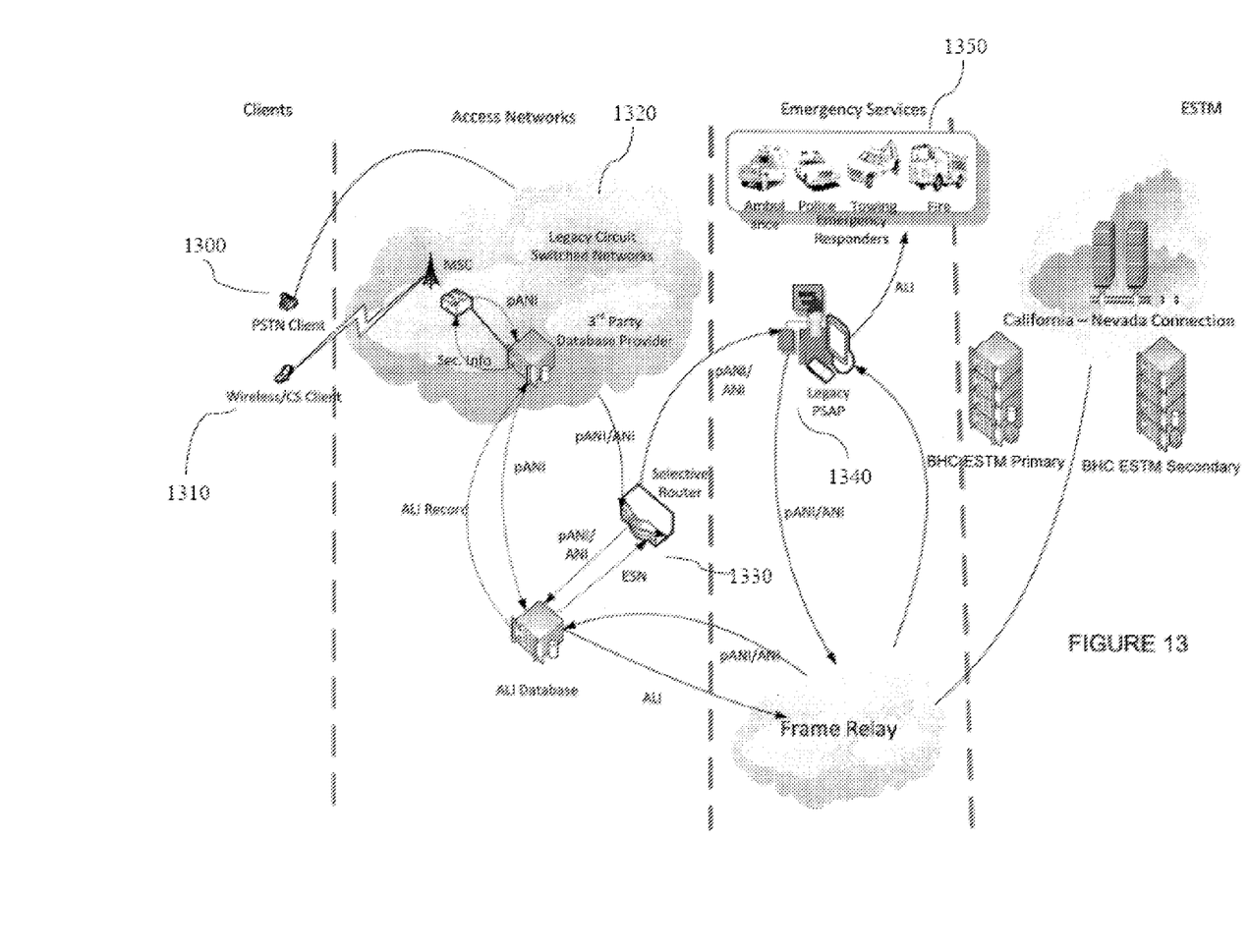
FIG. 13 illustrates an exemplary system in which the present invention operates.

FIG. 13 illustrates a typical 911 emergency telephone routing and response system. Emergency 911 calls originate from either a traditional landline phone 1300 or a cell phone 1310. These calls are initially received by the telecommunication company's switching networks 1320. For traditional landline phone calls, the switching network adds the Automatic Number Identification (ANI) to the call which allows the PSAP to identify the phone number, and thus, the location of the caller.

For wireless calls, the switching network adds a Pseudo Automatic Number Identification (pANI) which allows for wireless 911 callback capability and caller location identification. The pANI is a non-dialable number associated with a cell site or base station. The call, along with the ANI or pANI information is then sent to a Router 1330 which determine to where the call should be routed. In the case of e911 call, the routing is predetermined based on the pANI information contained in the call.

As previously described, it is the result of the present invention which would determine how calls should be initially routed by Router 1330. Historically, all 911 emergency calls would be routed by Router 1330 to the CHP. The present invention uses empirical data to determine whether this initial routing is the best in terms of emergency services response time and resource allocation. As shown in FIG. 13, the call is automatically routed by Router 1330 to the appropriate PSAP 1340. The PSAP 1340 handles the call and dispatches the appropriate Emergency Services unit 1350 as required.

Figure 14:
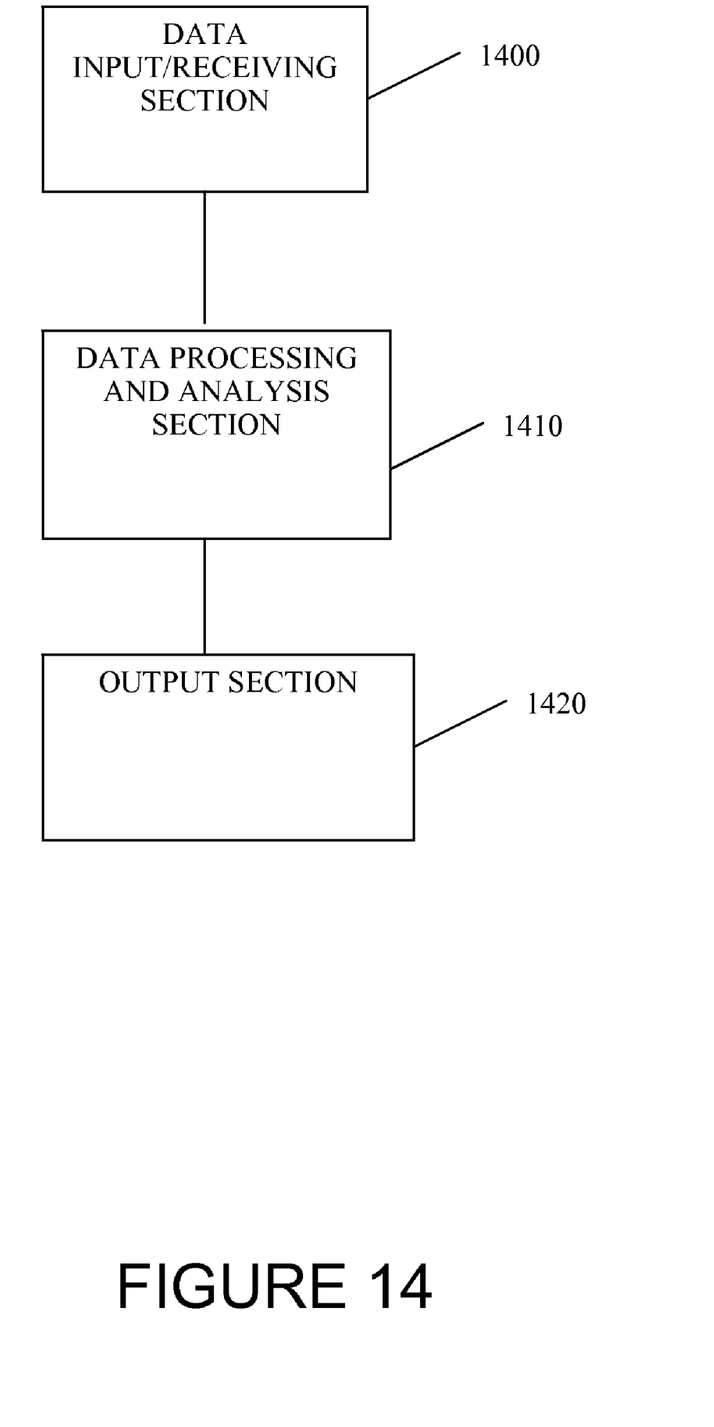
FIG. 14 illustrates an exemplary system of the present invention

FIG. 14 illustrates an exemplary system of the present invention. The system broadly includes three basic components, a Data input/Receiving Section 1400, a Data Processing and Analysis Section 1410 and an Output Section 1420. The Data Input/Receiving Section 1400 receives data from the users and from external sources. As previously described, in the preferred embodiment of the present invention, the data related to the 911 wireless calls are received by Data Input/Receiving Section 1400 from the wireless providers. Additional data regarding the calls can be received by Data Input/Receiving Section 1400 from a variety of sources such as the PSAPs themselves, other governmental agencies or other commercial sources. The data received by Data Input/Receiving Section 1400 is typically formatted in a wide variety of different formats. One of the functions of Data Input/Receiving Section 1400 is to take this data received in disparate and incompatible formats and to create uniform records corresponding to each phone call in each sector. Data Input/Receiving Section 1400 can be a stand alone computer system coupled to the Data Processing and Analysis Section 1410 or can be a component part of a larger computer system incorporating two or more of sections 1400-1420. In these embodiments, the computer systems are programmed to execute the methods of the present invention described herein. Alternatively, the Data Input/Receiving Section 1400 can be a specialized hardware component implementing the features described herein.

Data Processing and Analysis Section 1410 is the engine that drives the system of the present invention. Data Processing and Analysis Section 1410 is preferably a computer system programmed to execute the methods of the present invention described herein. Specifically, the Data Processing and Analysis Section 1410 executes the analysis illustrated in FIG. 5, operating on the data provided by the Data Input/Receiving Section 1400 in order to provide the user interface screens, the process control and the outputs illustrated in the FIGS. 6-12. Data Processing and Analysis Section 1410 can be a stand alone computer system coupled to the Data Processing and Analysis Section 1410 and the Output Section 1420 or can be a component part of a larger computer system incorporating two or more of sections 1400-1420. In a preferred embodiment, Data Processing and Analysis Section 1410 has interfaces so that a user can operate the system remotely, e.g. over the Internet. Such users of the system would be the PSAPs and other entities that are part of the process for approval of a cut over of 911 wireless calls, the entities that require the analysis of the present invention to make an informed an intelligent decision regarding the cut over.

The methods of the present invention can further be implemented as software instructions incorporated on a computer readable medium (e.g., disk). The software program when executed on a computer system, causes the computer system to perform the functions described herein.

Output Section 1420 preferably constitutes a display for providing the user with the various user interfaces and tabular and graphical representations as described an illustrated herein. Output Section 1420 can also comprise printers to generate hardcopies of the reports and maps generated by the system. Output Section 1420 can also further comprise interfaces for exporting the reports to external sources.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A method for determining routing of telephone calls from wireless devices to a 911 system, the method operable on a computer system, the method comprising:
receiving 911 wireless call data, the 911 wireless call data comprising location information related to the geographic location of an origin of a telephone call, and comprising sector information related to an antenna sector which processed the telephone call;
determining a jurisdiction corresponding to the geographic location of the origin of the telephone call;
determining a number of telephone calls that originate in different jurisdictions over a predetermined period of time;
for at least one antenna sector, determining if the number of telephone calls originating in a particular jurisdiction exceeds a predetermined threshold; and
if the number of telephone calls exceeds the predetermined threshold, determining that the future telephone calls of different origins received by the at least one antenna sector should be routed to a 911 system associated with the particular jurisdiction.

2. The method according to claim 1, further comprising:
generating a representation of the geographic location of the origin of a plurality of telephone calls; and
displaying the representation to a user.

3. The method according to claim 2, wherein the representation is a geographic map with the location of the origin of the plurality of telephone calls plotted thereon.

4. The method according to claim 3, wherein boundaries different jurisdictions are displayed on the geographic map.

5. The method according to claim 2, wherein the representation includes at least one table describing at least one of the determinations.

6. The method according to claim 1, wherein the 911 wireless call data further comprises a length of time of the telephone call.

7. The method according to claim 1, wherein telephone calls were originally routed to an original Public Safety Answering Point (PSAP) and it is determined that more than the predetermined threshold number of telephone calls originated in a jurisdiction of a new PSAP.

8. The method according to claim 7, further comprising instructing the operator of the at least one antenna sector to route all future telephone calls to the new PSAP.

9. The method according to claim 7, further comprising determining a number of telephone calls transferred by the original PSAP to the new PSAP.

10. The method according to claim 7, further comprising determining a projected number of new telephone calls expected to be routed to the new PSAP.

11. The method according to claim 1, further comprising determining if the antenna sector is in a buffer zone of a highway.

12. The method according to claim 1, further comprising determining if a coverage area of the antenna sector includes a highway.

13. The method according to claim 12, further comprising determining a number of telephone calls originating in a buffer zone of the highway and determining a number of telephone calls originating out of the buffer zone.

14. The method according to claim 1, wherein the predetermined threshold is 51% of all the telephone calls in the predetermined period of time.

15. A method for tracking decisions for routing of telephone calls from wireless devices to a 911 system, the method operable on a computer system, the method comprising:
receiving 911 wireless call data, the 911 wireless call data comprising location information related to the geographical location of the origin of the telephone call, and comprising sector information related to an antenna sector which processed the telephone call;
determining a jurisdiction corresponding to the geographic location of the orgin of the telephone call;
determining a number of telephone calls that originate in different jurisdictions over a predetermined period of time;
for at least one antenna sector, determining if the number of telephone calls originating in a particular jurisdiction exceeds a predetermined threshold, providing a interface for use by at least one decision maker;
displaying at least one of the determinations to the decision maker; and
receiving a decision from the at least one decision maker regarding the routing of telephone calls in the at least one sector.

16. The method according to claim 15, further comprising executing additional determinations at the request of the at least one decision maker.

17. The method according to claim 15, wherein there a plurality of decision makers, each one representing a different jurisdiction in which a telephone call originated, the method further comprising receiving a decision from each of the decision makers.

18. The method according to claim 15, further comprising determining if the number of telephone calls originating in a particular jurisdiction exceeds the predetermined threshold for a plurality of antenna sectors.

19. A computer readable medium having program code stored thereon which, when run on a computer, causes the computer to determining routing of telephone calls from wireless devices to a 911 system comprising:
receiving 911 wireless call data, the 911 wireless call data comprising location information related to the geographical location of an origin of a telephone call, and comprising sector information related to an antenna sector which processed the telephone call;
determining a jurisdiction corresponding to the geographic location of the origin of the telephone call;
determining a number of telephone calls that originate in different jurisdictions over a predetermined period of time;
for at least one antenna sector, determining if the number of telephone calls originating in a particular jurisdiction exceeds a predetermined threshold;
if the number of telephone calls exceeds the predetermined threshold, that the future telephone calls of different origins received by the at least one antenna sector should be routed to a 911 system associated with the particular jurisdiction.

20. A system for determining routing of telephone calls from wireless devices to a 911 system, the system comprising
an input/receiving section that receives 911 wireless call data, the 911 wireless call data comprising location information related to the geographical location of the origin of the telephone call, and comprising sector information related to an antenna sector which processed the telephone call;
a data processing and analysis section coupled to the input/receiving section, the data processing and analysis section:
determining a jurisdiction corresponding to the geographic location of the origin of the telephone call,
determining a number of telephone calls that originate in different jurisdictions over a predetermined period of time, and for at least one antenna sector,
determining if the number of telephone calls originating in a particular jurisdiction exceeds a predetermined threshold;
if the number of telephone calls exceeds the predetermined threshold, determining that the future telephone calls of different origins received by the at least one antenna sector should be routed to a 911 system associated with the particular jurisdiction; and
an output section coupled to the data processing and analysis section, the output section outputting a graphical representation of at least one of the determinations of the data processing and analysis section.

* * * * *